2,951,832
FLUOROELASTOMERS

Albert L. Moran, Wilmington, Del., assignor to E. I. du Pont de Nemours and Company, Wilmington, Del., a corporation of Delaware No Drawing. Filed Sept. 26, 1958, Ser. No. 763,425

13 Claims. (Cl. 260—875)

This invention relates to improved fluoroelastomers and a process for making them, and more particularly to copolymers of vinylidene fluoride and hexafluoropropylene. This application is a continuation-in-part of my copending application Serial No. 697,291, filed November 18, 1957.

The elastomeric copolymer of vinylidene fluoride and hexafluoropropylene has become of particular value because of its high temperature stability and its good resistance to a wide variety of solvents, oils, fuels and the like, particularly at high temperatures. These polymers are usually prepared by copolymerizing a mixture of vinylidene fluoride and hexafluoropropylene in which vinylidene fluoride units comprise from 30% to 70% by weight of the elastomer, the balance being hexafluoropropylene. This copolymer is described in further detail in an article by Dixon, Rexford and Rugg in Industrial and Engineering Chemistry, page 1687, October 1957.

While these elastomeric copolymers may be cross-linked or cured in a number of ways, a preferred method of curing is by the use of polyamines, as more particularly mentioned in the article referred to above, and a blocked diamine such as hexamethylenediamine carbamate has been particularly suggested in current literature. In the compounding of these elastomers, temperatures are sometimes reached which cause premature cross-linking or scorching, and therefore a more universally applicable curing agent which has a greater leeway with regard to its scorching propensities, or a method of modifying the polyalkylenediamines to give compounds which are operable under a broader range of processing conditions, is desirable. In any case, it is desirable to retain or improve the elastomeric properties of the vinylidene fluoride-hexafluoropropylene copolymer.

Furthermore, because of their excellent high temperature resistance, these elastomers are particularly suitable for use in the manufacture of tubing employed as aircraft hose which is used to carry fuels, lubricants, etc., at high temperatures and under high pressures. In this particular application, however, it has been found that under the actual use conditions of high temperature and pressure, when the temperature and pressure are raised and lowered intermittently over a period of time blisters sometimes form on the surfaces and throughout the elastomer.

It is an object of this invention to provide an improved process for the curing or cross-linking of the elastomeric copolymers of vinylidene fluoride-hexafluoropropylene which permits the copolymer to be compounded over a wider range of temperatures than has heretofore been possible, without causing premature curing or scorching. It is a further object of the invention to produce vinylidene fluoride-hexafluoropropylene copolymer elastomers having good tensile strength, modulus of elongation and compression set when cured, and to improve the processability of the stock prior to curing.

According to the present invention, vinylidene fluoride-hexafluoropropylene copolymer elastomers having improved scorch-resistance and other improved processing characteristics with good tensile strength, compression set and high temperature properties when cured, may be produced by homogeneously incorporating into the elastomer prior to curing from 1.0% to 6.0%, based on the weight of the elastomer, of an N,N'-diarylidenealiphaticdiamine, such as N,N'-dibenzylidene (or substituted dibenzylidene) alkanediamine, or by homogeneously incorporating into the elastomer materials which will form the compound in situ. These compounds have the general formula:

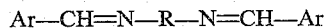

Ar—CH=N—R—N=CH—Ar where Ar is an aromatic radical of the benzene series, and R is a saturated aliphatic or cycloaliphatic hydrocarbon radical of from 4 to 18 carbon atoms.

These compounds are produced in known manner by the reaction of an aromatic aldehyde with an aliphatic or cycloaliphatic diamine. They are also produced by reacting a diarylidene-1,2-propylene-(or ethylene-)diamine with a $C_4$ to $C_{18}$ aliphatic or cycloaliphatic diamine or diamine carbamate, which diamines or diamine carbamates have heretofore been used as curing agents for these elastomers [see for instance, U.S. Patent 2,181,121 of November 28, 1939, and also the article by Mason in Berichte 20, 267 (1887)]. When produced in situ in the elastomer an amount of from 0.5% to 3.0%, based on the weight of the elastomer, of the N,N'-diarylidene-1,2-propylene-(or ethylene-)diamine is used with preferably at least a molar equivalent of the longer carbon chain aliphatic or cycloaliphatic diamines or diamine carbamates normally used in the curing of these elastomers. Where the aldehyde itself is added, about 2 mols should preferably be used per mol of diamine or diamine carbamate.

It has been found that the N,N'-diarylidenepropylene-(or ethylene-)diamines give very slow cures of the vinylidene fluoride-hexafluoropropylene copolymer elastomers, and of course are therefore not scorchy at the ordinary compounding temperatures although at higher temperatures they do effect a cure but not at a rate which gives them practical utility when used alone as curing agents. However, these lower diarylidenealkanediamines react with higher alkylenediamines, such as hexamethylenediamine or the corresponding hexamethylenediamine carbamate, to form, for example, the diarylidenehexamethylenediamines. When this reaction takes place in the elastomer itself, there of course remains in the elastomer the ethylenediamine or propylenediamine, as the case may be, which at the higher vulcanizing temperatures aids in the vulcanization or curing of the vinylidene fluoride-hexafluoropropylene copolymer elastomer, and, because the diarylidenehaxamethylenediamine compound is much less scorchy than the hexamethylenediamine alone or the hexamethylenediamine carbamate, excellent cures of the elastomer are obtained without any scorching at normal working temperatures.

The preferred curing agent in the present invention is therefore the combination of a disalicylideneethylenediamine or a disalicylidene-1,2-propylenediamine with hexamethylenediamine carbamate. The curing agent of the present invention gives very satisfactory cures at the relatively low temperature of from 150° to 200° C. without imparting to the compounded copolymer elastomer any undesirable scorching properties. At higher temperatures, such as above 200° C., very fast cures are obtainable. Temperatures as high as 320° C. for 15 hours have been found to be satisfactory without detrimental effect to the cured elastomer.

In addition to not being scorchy, the curing agent of the present invention yields a cured elastomer of as good as or of greater tensile strength than obtainable with hexamethylenediamine carbamate itself, giving very desirable states of cure without using excessive amounts of the curing agent, and due to the non-scorchy characteristics of these curing agents stocks are obtained having excellent processability, thereby permitting compounding, molding or extruding of the articles without detrimental scorchy effects.

The reaction of the aromatic aldehyde and the aliphatic diamine or of the diarylidenepropylene- or ethylenediamine with the higher aliphatic or cycloaliphatic diamine or diamine carbamate, takes place at ordinary room temperatures. The diamines or diamine carbamates employed in the present invention should be aliphatic or cycloaliphatic diamines containing from 4 to 18 carbon atoms. The aromatic diamines do not give curing agents comparable to those of the present invention.

The following compounds are illustrative of the N,N'-diarylidenealiphaticdiamine compounds which may be employed in the present invention:

N,N'-dibenzylidenetetramethylenediamine
N,N'-dibenzylidenehexamethylenediamine
N,N'-disalicylidenehexamethylenediamine
N,N'-disalicylidenedecamethylenediamine
N,N' - di(p - dimethylaminobenzylidene)hexadecamethylenediamine
N,N' - di(o - diethylaminobenzylidene)octadecamethylenediamine
N,N'-dibenzylidenecyclohexane-1,3-diamine
N,N' - dibenzylidene(4,4' - dicyclohexylmethane - 4,4'-diamine)

and the like. Because of its availability and the satisfactory results which are obtained, the N,N'-disalicylidenehexamethylenediamine is preferred. As pointed out above, these compounds may be employed as such, or the corresponding aldehydes or the diarylideneethylene-(or propylene-)diamines, and the $C_4$ to $C_{18}$ diamine or diamine carbamates may be incorporated separately into the elastomer prior to heat-curing.

The aromatic aldehydes that are useful in this invention are particularly those of the benzene series which have only one aldehyde group attached to the benzene nucleus and which have no other substituents in the molecule which will react, under the conditions in which they are used, with the aliphatic diamines.

The N,N'-diarylidenealiphaticdiamines of the present invention are added to the elastomer on the rubber mill by conventional techniques in amounts of from 1 to 6 grams per 100 grams of elastomer, the amount being varied to give the desired state of cure. Usually from 1 to 3 grams per 100 grams of elastomer will be preferred.

The vinylidene fluoride-hexafluoropropylene copolymer with which the present curing agents are employed may be compounded in the usual manner and should preferably contain an acid acceptor such as zinc oxide, lead oxide, dibasic lead phosphate or magnesium oxide. Magnesium oxide is preferred when operating with the curing agents of the present invention. The amount of acid acceptor may vary over wide limits such as from 5 to 25 parts per 100 parts of the fluoroelastomer. The usual fillers such as carbon black, silica, etc., plasticizers, dyes or other materials may of course be incorporated, as more fully described in the already published literature on these elastomers.

These curing agents may be used in combination with other curing agents such as organic peroxides. Stocks compounded with organic peroxides and the N,N'-diarylidenealiphaticdiamines of this invention do not have the undesirable scorch tendency of stocks compounded for curing with peroxides as the sole curing agent.

Also, as described in the published literature, the curing of these fluoroelastomers is preferably carried out in two steps: first, by heating to 150°–200° C. in the mold for approximately one hour (usually designated as "press curing temperature") and then oven-cured at temperatures about 200° C. or above to effect the final and complete cure. This latter curing may be carried out for any particular time, depending upon the state of cure desired. Usually from 8 to 24 hours will give a completely cured product.

The curing agents of this invention are incorporated into the copolymer elastomer by conventional methods such as by milling in heavy-duty mixers or on the usual rubber milling equipment. The materials may be incorporated in the copolymer elastomer in any order desired. Ordinarily water-cooled milling equipment will be used so that curing or cross-linking temperatures are not reached.

Since improved cures are obtained by adding to the elastomer the already prepared N,N'-diarylidenealiphaticdiamine compound or by adding the materials which ordinarily are converted to this compound, and since it is difficult to give a logical explanation of how this product can break down into a diamine and aldehyde, it is believed that the N,N'-diarylidenealiphaticdiamine is the curing agent in all cases, but the present invention is not based on any particular theory of the chemistry involved.

As more particularly illustrated in the following examples, with the fluoroelastomer which has been particularly compounded for use in the manufacture of tubing for carrying hydrocarbon or other type solvents at relatively high temperatures, when curing with the hexamethylenediamine carbamate blistering sometimes occurs on the surface of the elastomers, but with the curing agents of the present invention this difficulty is overcome.

The following examples are given to illustrate the invention. The parts used are by weight, unless otherwise specified.

*Example 1*

A copolymer consisting of 40% by weight of hexafluoropropylene and 60% by weight of vinylidene fluoride was compounded according to the following formulations:

|  | Parts by Weight | |
| --- | --- | --- |
|  | A | B |
| Fluoroelastomer | 100 | 100 |
| Magnesium oxide ("Maglite" D) | 15 | 15 |
| Thermax (carbon black filler) | 60 | 60 |
| N,N'-disalicylidenepropylenediamine [1] | | 1.3 |
| Hexamethylenediamine carbamate | 1.25 | 1.25 |
| Mooney Scorch Test at 250° F. (minutes to a 10 point rise) | 7 | 26 |

[1] Added as a 65% solution in an aromatic solvent such as xylene.

The above compositions were cured in a press at 275° F. for 30 minutes and subjected to an aftercure in an air oven at 212° F. for 1 hour, 250° F. for 1 hour, 300° F. for 1 hour, 350° F. for 1 hour and finally at 400° F. for 24 hours.

|  | A | B |
| --- | --- | --- |
| Stress Strain at 70° F.: | | |
| Tensile at break (lbs./sq. in.) | 2,400 | 2,875 |
| 100% Modulus (lbs./sq. in.) | 1,225 | 1,625 |
| Elongation at break (percent) | 210 | 180 |
| Shore A hardness | 85 | 86 |
| Stress Strain at 300° F.: | | |
| Tensile at Break (lbs./sq. in.) | 584 | 1,023 |
| Elongation at Break (percent) | 100 | 60 |
| Compression Set: 70 hrs. at 250° F., Method B, ASTM | 58.7 | 29.7 |

The compounded elastomers were subjected to a test for blistering as follows:

1½" square sample pieces of the cured elastomers 75 mils thick were submerged in "Turbo Oil No. 15"

(a diester lubricant—M.I.L. 7808) and the submerged samples placed in an autoclave which were heated to 400° F. and pressured with nitrogen to 800 lbs./sq. in. After 8 hours, the samples were removed and observed visually for blisters. It was observed that sample A was badly blistered, while no blisters were seen on sample B.

Similar results to those shown above were obtained, using from 0.65 part to 1.95 parts of disalicylidenepropylenediamine, based on 100 parts by weight of the elastomer.

As illustrated in the above example, it is often desirable to carry out the cure by stepwise progression to the final curing temperature. This method allows the elimination of any gas formed during the cure or which may be incorporated during the mixing process, without causing porosity in the vulcanizate.

*Example 2*

150 grams of a copolymer of 60% by weight of vinylidene fluoride and 40% of hexafluoropropene (this corresponds to 78 mol percent of vinylidene fluoride) was compounded on a rubber mill with 15 grams of magnesium oxide, 3.5 grams (.01 mol) of N,N'-disalicylidenehexamethylenediamine, and 18 grams of medium thermal carbon black. No rise in viscosity was shown when the mixture was subjected to the Mooney scorch test at 121° C. for 45 minutes. The compounded elastomer was placed into a slab mold and held at 204° C. for 60 minutes. Then the partially cured elastomer was removed from the mold without difficulty. No evidence of scorching was present. The slab was cured completely by placing it in an oven at 200° C. for 24 hours.

The cured elastomer was evaluated for stress strain properties and gave the following values:

Tested at 25° C.:
    Tensile at break _____lbs./sq. in__ 2700
    Elongation at break _____percent__ 170
    Modulus—100% _____lbs./sq. in__ 1450
Tested at 150° C.:
    Tensile at break _____lbs./sq. in__ 750
    Elongation at break _____percent__ 80

As a control, the elastomer was compounded and cured as above except that the disalicylidenehexamethylenediamine was replaced with 1.55 grams (0.01 mol) of hexamethylenediamine carbamate. In the Mooney scorch test at 121° C., this compounded elastomer showed a 10 point rise in 10 minutes. Stress strain properties of the cured elastomer were as follows:

|  | Tested at 25° C. | Tested at 150° C. |
|---|---|---|
| Tensile at break (lbs./sq. in.) | 1,800 | 450 |
| Elongation at break (percent) | 150 | 70 |
| Modulus—100% (lbs./sq. in.) | 800 | |

As indicated above, where molar equivalents of the curing agents were used the N,N'-disalicylidenehexamethylenediamine gave improved tensile at room temperatures, and at 150° C. a higher state of cure.

*Example 3*

A. 100 grams of the fluoroelastomer used in Example 2 was compounded with 2 grams of N,N'-dibenzylidenehexamethylenediamine, 15 grams of magnesium oxide, 18 parts of MT Black, and cured as in Example 2 except that a cure in the mold for 60 minutes at 150° C. was used.

B. Instead of N,N'-dibenzylidenehexamethylenediamine, 2.5 grams of N,N'-di(p-dimethylaminobenzylidene)-hexamethylenediamine was used in accord with the details of "A" above, the mold cure temperature again being 150° C.

C. As a control, 1.5 grams of hexamethylenediamine carbamate was used in accord with the details of "A" above.

The compounded and cured polymers A, B and C were evaluated and found to have the following stress strain properties as measured at 25° C.:

|  | A | B | C |
|---|---|---|---|
| Tensile at break (lbs./sq. in.) | 2,300 | 2,600 | 1,600 |
| Elongation at break (percent) | 230 | 190 | 150 |
| Modulus—100% (lbs./sq. in.) | 560 | 810 | 740 |

It will be observed that the tensile strength values of A and B are very high and much better than C, the hexamethylenediamine carbamate control.

*Example 4*

A sample of the copolymer (40% hexafluoropropylene-60% vinylidene fluoride) elastomer was compounded as follows:

|  | Parts by Weight | | | |
|---|---|---|---|---|
|  | A | B | C | D |
| Elastomer | 100 | 100 | 100 | 100 |
| Magnesium oxide | 15 | 15 | 15 | 15 |
| Medium thermal black | 18 | 18 | 18 | 18 |
| Hexamethylenediamine carbamate | 1 | | | |
| N,N'-di(o-methoxybenzylidene)-1,6-hexanediamine (1) | | 2.1 | | |
| N,N'-dicinnamylidene-1,6-hexanediamine (2) | | | 2.1 | |
| N,N'-di(p-methoxybenzylidene)-1,6-hexanediamine (3) | | | | 2.1 |

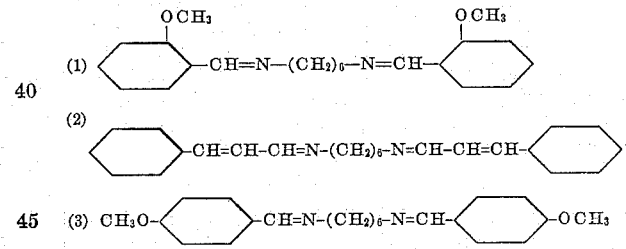

The compounded elastomers were subjected to the Mooney Scorch Test and time for a 10 point rise was determined:

|  | A | B | C | D |
|---|---|---|---|---|
| Time for a 10 point rise (Min.) | 11 | No rise in 45 min. | 29 | 45 |

The excellent low scorch properties of these stocks are evident.

The compounded stocks were cured at 150° C. for 60 minutes and then cured for 18 hours at 204° C. and physical properties of the cured elastomers then determined. The data follow:

|  | A | B | C | D |
|---|---|---|---|---|
| Tensile at break (lbs./sq. in.) | 1,900 | 2,175 | 2,500 | 2,550 |
| Elongation at break (percent) | 240 | 255 | 345 | 300 |
| Modulus—100% (lbs./sq. in.) | 500 | 463 | 420 | 400 |
| Compression set | 25 | 20 | 25 | 23 |

*Example 5*

A copolymer elastomer stock containing 40% of hexafluoropropylene and 60% of vinylidene fluoride units as employed in the above examples, was compounded as follows:

|  | Parts by Weight | |
|---|---|---|
|  | A | B |
| Elastomer | 100 | 100 |
| Medium thermal black | 60 | 60 |
| Magnesium Oxide | 20 | 20 |
| Hexamethylenediamine carbamate | 1.1 | 1.1 |
| Benzaldehyde | 1.33 | ---- |

The compounded stocks were press cured at 135° C. for 13 minutes and oven cured for a period of 24 hours at 240° C. The physical properties of the cured elastomer tested at 25° C. were as follows:

|  | A | B |
|---|---|---|
| Mooney Scorch Test (Min. to a 10 point rise) | Over 45 | 5.5 |
| Tensile at break (lbs./sq. in.) | 1,700 | 1,695 |
| Elongation at break (percent) | 215 | 270 |
| Modulus—100% (lbs./sq. in.) | 850 | 815 |

While in the above examples a copolymer stock containing 40% hexafluoropropylene and 60% vinylidene fluoride units has been employed, the same general improvement in lack of scorch and having good physical properties is obtained when any of the hexafluoropropylene-vinylidene fluoride copolymer elastomers are cured according to this invention. Usually the proportions of hexafluoropropylene units in copolymer elastomer stock consisting of hexafluoropropylene and vinylidene fluoride will range from 30% to 70% by weight.

I claim:

1. In a process for curing a vinylidene fluoridehexafluoropropylene copolymer elastomer containing from 30% to 70% by weight of hexafluoropropylene units and containing from 5% to 25%, based on the weight of the elastomer, of an acid acceptor, the step which comprises incorporating into the uncured elastomer from 1.0% to 6.0%, based on the weight of the elastomer, of an N,N'-diarylidenealiphaticdiamine of the formula:

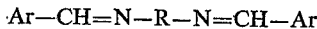

where Ar is an aromatic radical of the benzene series and R is a saturated aliphatic or cycloaliphatic hydrocarbon radical of from 4 to 18 carbon atoms.

2. The process of claim 1 in which the acid acceptor is magnesium oxide.

3. The process of claim 1 in which the N,N'-diarylidenealiphaticdiamine is N,N'-dicinnamylidene-1,6-hexanediamine.

4. The process of claim 1 in which the N,N'-diarylidenealiphaticdiamine is N,N'-disalicylidenehexamethylenediamine.

5. The process of claim 4 in which the acid acceptor is magnesium oxide.

6. In a process for curing a vinylidene fluoridehexafluoropropylene copolymer elastomer containing from 30% to 70% by weight of hexafluoropropylene units and containing from 5% to 25%, based on the weight of the elastomer, of an acid acceptor, the step which comprises incorporating into the elastomer prior to curing from 0.5% to 3.0%, based on the weight of the elastomer, of a compound of the group consisting of N,N'-diarylideneethylenediamine and N,N'-diarylidenepropylenediamine in which the arylidene group in each case is of the benzene series, and at least a molar equivalent of a compound of the group consiting of aliphatic or cycloaliphatic diamines and diamine carbamates containing an aliphatic chain of at least 4 carbon atoms.

7. The process of claim 6 in which the acid acceptor is magnesium oxide.

8. A curable vinylidene fluoride-hexafluoropropylene copolymer elastomer containing from 30% to 70% by weight of hexafluoropropylene units, having intimately incorporated therein from 1.0% to 6.0%, based on the weight of the elastomer, of an N,N'-diarylidenealiphaticdiamine of the formula:

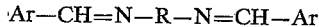

where Ar is an aromatic radical of the benzene series and R is a saturated aliphatic or cycloaliphatic hydrocarbon radical from 4 to 18 carbon atoms and from 5% to 25%, based on the weight of the elastomer, of an acid acceptor.

9. A curable vinylidene fluoridehexafluoropropylene copolymer elastomer of claim 8 in which the acid acceptor is magnesium oxide.

10. A curable vinylidene fluoride-hexafluoropropylene copolymer elastomer containing from 30% to 70% by weight of hexafluoropropylene units, having intimately incorporated therein from 1.0% to 6.0%, based on the weight of the elastomer, of N,N'-disalicylidenehexamethylenediamine and from 5% to 25%, based on the weight of the elastomer, of an acid acceptor.

11. A curable vinylidene fluoridehexafluoropropylene copolymer elastomer of claim 10 in which the acid acceptor is magnesium oxide.

12. A curable vinylidene fluoride-hexafluoropropylene copolymer elastomer containing from 30% to 70% by weight of hexafluoropropylene units, having intimately incorporated therein from 1.0% to 6.0%, based on the weight of the elastomer, of N,N'-dicinnamylidene-1,6-hexanediamine and from 5% to 25%, based on the weight of the elastomer, of an acid acceptor.

13. A cured vinylidene fluoride-hexafluoropropylene copolymer elastomer obtained by the process including the step of claim 1.

No references cited.